March 3, 1931.      C. C. TERWILLIGER      1,795,186
CONTAINER FOR SPRADDLED FOWL
Filed Feb. 15, 1930
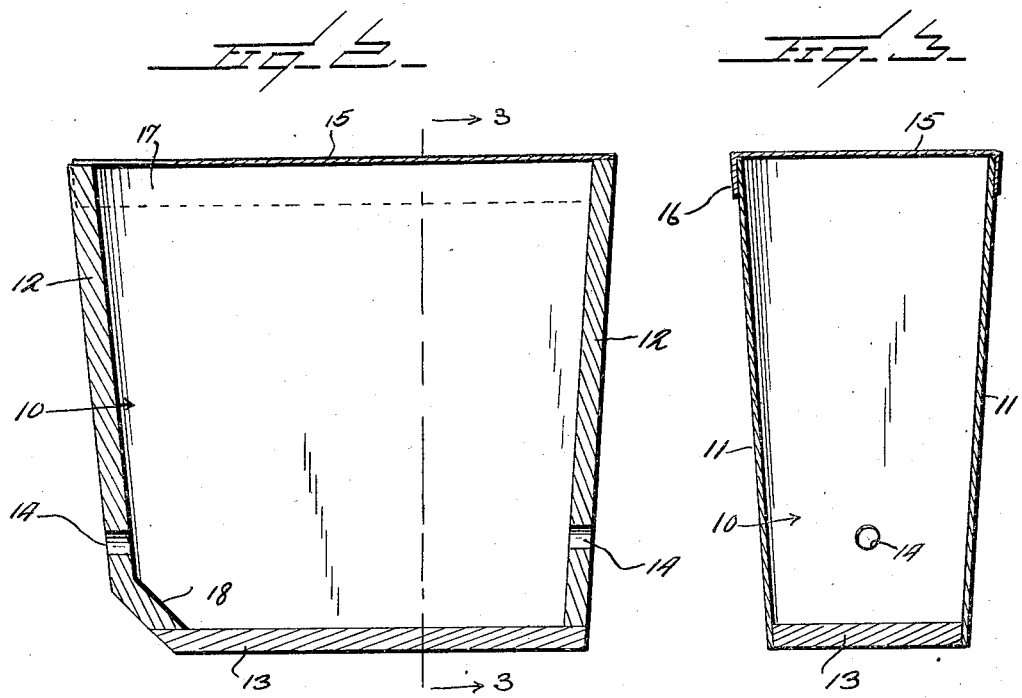
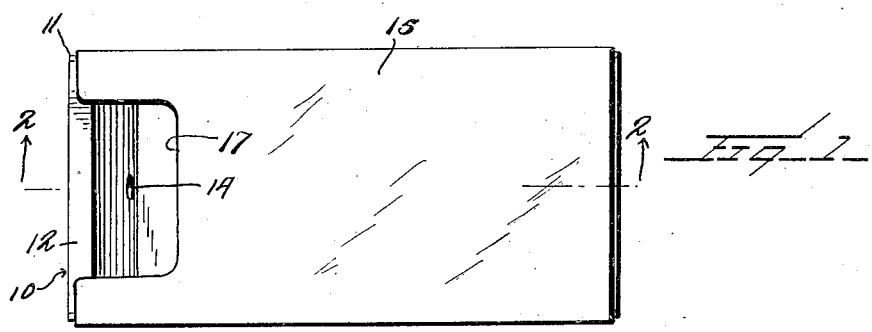
Inventor
C. C. Terwilliger
By Watson E. Coleman
Attorney Patented Mar. 3, 1931

1,795,186

UNITED STATES PATENT OFFICE

CHRISTOPHER C. TERWILLIGER, OF DELANSON, NEW YORK

CONTAINER FOR SPRADDLED FOWL

Application filed February 15, 1930. Serial No. 428,812.

The present invention relates to a container which is adapted for use in correcting deformities in fowl or the like, and more particularly to correcting what is commonly termed "spraddling."

An object of this invention is to provide a container of this character which is adapted to be used with young fowl so as to correct deformities in the limbs of the fowl.

Another object of this invention is to provide a container which is so constructed as to comfortably support a young fowl therein for a short period of time and preferably within a short time after the birth or hatching of the fowl when deformities in the limbs of the fowl may be readily corrected without the use of instruments or the like.

A further object of this invention is to provide a container which is readily and cheaply manufactured.

A still further object of this invention is to provide a container which will comfortably and firmly hold a fowl therein against turning movement or the like and so that the limbs of the fowl will depend in the lower portion of the container, it being understood that the fowl will be closely confined within the container for a period of from twelve to twenty-four hours which, during the early stages in the life of the fowl, is sufficient time within which to correct deformities frequently occurring in the limbs of the fowl.

The above and various other objects and advantages of this invention will in part be described in and in part be understood from the following detailed description of the present preferred embodiment, the same being illustrated in the accompanying drawing wherein:—

Figure 1 is a detailed top plan view of a device constructed according to the preferred embodiment of this invention;

Figure 2 is a longitudinal section taken on the line 2—2 of Figure 1; and

Figure 3 is a transverse section taken on the line 3—3 of Figure 2.

Referring to the drawing wherein like numerals of reference designate corresponding parts throughout the several views, the numeral 10 designates generally a container which is provided with opposite side portions 11, end members 12 and a bottom 13. The side members 11 are mounted in angular relation to the bottom of the container and the end members 12 are preferably of flaring type, being substantially wedge-shaped and having the restricted portion at the bottom and the enlarged portion at the upper end thereof. The space between the opposite side members 11 is such as to hold therebetween a small fowl or the like, the fowl being held against turning movement but permitted to rest on the bottom 13. The opposite end portions 12 of the container are provided with ventilating openings 14 spaced upwardly from the lower end portions thereof.

A slidable top member 15 is loosely positioned upon the top of the container and is provided with a pair of depending inwardly extending flanges 16 which slidably engage the upper edge portions of the sides 11. The top member 15 is provided with an enlarged opening 17 in one end thereof, the opening 17 being of sufficient size so that the head of the fowl may protrude therethrough and so as to adequately ventilate the container while the fowl is positioned therein. While the top member 15 is herein disclosed as being slidably positioned on the container 10, I do not wish to be understood as being limited to this construction, as the top 15 may be secured to the container in any other desired manner.

In the preferred embodiment of this invention the top member 15 is shown as being provided with depending flange members 16 which slidably secure or hold the top on the casing, this structure being preferred in view of the fact that through the use of this structure an exceedingly practical container may be provided, and the end members 12 are also angularly inclined from the base 13, the front end having an inwardly inclined lower portion 18.

In the use of this device, the top 15 may be slid outwardly along the upper edge portions of the sides 11 so that a small fowl or the like may be positioned within the container. The container is of a size so that the sides of the container will engage about the opposite sides of the fowl so that the legs or limbs of the fowl cannot spread outwardly, the fowl being confined in the container for a period of time sufficient to correct the deformity.

The container herein disclosed may be constructed of any desired material such as wood, cardboard, metal or the like but preferably the container 10 together with the top member 16 is constructed of material having sufficient weight so that the fowl confined therein will not tip the container over.

It will, of course, be understood that various changes and modifications may be made in the details of construction and design of the above specifically described embodiment of the invention without departing from the spirit thereof, such changes and modifications being restricted only by the scope of the following claims.

What is claimed is:—

1. A device of the character described comprising a container having flaring side portions adapted to closely engage about the body of a fowl whereby to hold the fowl against movement, closure means, said closure means having an aperture therethrough whereby to permit the projection of the head of the fowl therethrough.

2. A device of the character described comprising a container having an open upper end portion, said container having a restricted bottom portion and flaring side walls, said container being adapted to closely engage about the body of the fowl, said fowl when positioned within the container being confined against turning movement therein, and an apertured closure member for said container.

3. A device of the character described comprising a container having an open top portion and a closed bottom portion, the opposite side portions of said container being angularly inclined from the bottom, said container having ventilating apertures in the ends thereof, and a removable apertured closure member for said container.

4. A device of the character described comprising a container having an open upper end portion and a closed bottom portion, a pair of angularly inclined side portions, a pair of apertured wedge-shaped end portions, said apertures in said end portions being positioned spaced upwardly from the bottom of the container, and closure means engaging the upper end portion of said container.

In testimony whereof I hereunto affix my signature.

CHRISTOPHER C. TERWILLIGER.